United States Patent [19]

Kiiskilä

[11] Patent Number: 4,909,899
[45] Date of Patent: Mar. 20, 1990

[54] METHOD OF CONCENTRATING SLUDGES

[75] Inventor: Erkki J. Kiiskilä, Karhula, Finland

[73] Assignee: A. Ahlstrom Corporation, Noormarkku, Finland

[21] Appl. No.: 99,064

[22] Filed: Sep. 21, 1987

[30] Foreign Application Priority Data

Sep. 22, 1986 [FI] Finland .................................. 864549

[51] Int. Cl.$^4$ .............................................. B01D 3/06
[52] U.S. Cl. .................................... 159/47.3; 159/2.1; 159/24.2; 159/DIG. 32; 162/29; 162/47; 202/235; 203/22; 203/27; 203/88; 203/DIG. 8
[58] Field of Search .................... 159/2.1, 24.2, 47.3, 159/DIG. 32; 203/22, 88, 27, DIG. 8; 202/235; 162/47, 29, 30.11, 30.1; 110/341

[56] References Cited

U.S. PATENT DOCUMENTS

| 2,754,897 | 7/1956 | Ramen | 159/47.3 |
| 2,796,120 | 6/1957 | Lockman et al. | 159/47.3 |
| 3,047,362 | 7/1962 | Smith | 159/47.3 |
| 3,286,763 | 11/1966 | Jacoby | 159/47.3 |
| 3,414,038 | 12/1968 | Laakso | 159/2.1 |
| 3,425,477 | 2/1969 | Farin | 162/47 |
| 3,583,339 | 6/1971 | Kube | 110/346 |
| 3,783,095 | 1/1974 | Jafs et al. | 159/47.3 |
| 3,912,577 | 10/1975 | Akune et al. | 159/47.3 |
| 4,076,576 | 2/1978 | Marttala | 159/47.3 |
| 4,441,437 | 4/1984 | Moskau | 159/48.2 |
| 4,530,737 | 7/1985 | Östman | 159/47.3 |
| 4,687,546 | 8/1987 | Willis | 159/2.1 |

FOREIGN PATENT DOCUMENTS

| 1049713 | 3/1979 | Canada | 162/47 |
| 1097465 | 3/1981 | Canada | 162/47 |

OTHER PUBLICATIONS

R. S. Andrews, Jr. and R. W. Roscoe, "Thin-Film Evaporation of Black Liquor to High Solids as an Investment", Tappi/Dec. 1981, vol. 64, No. 12.

Primary Examiner—Virginia Manoharan
Attorney, Agent, or Firm—Toren, McGeady & Associates

[57] ABSTRACT

A method of concentrating sludges wherein liquor is heated under pressure indirectly with flue gases from the combustion of previously concentrated sludge, after which the sludge is caused to expand or subjected to reduced pressure which results in evaporation of water and concentration of the sludge to a dry-substance content of over 55%.

2 Claims, 1 Drawing Sheet

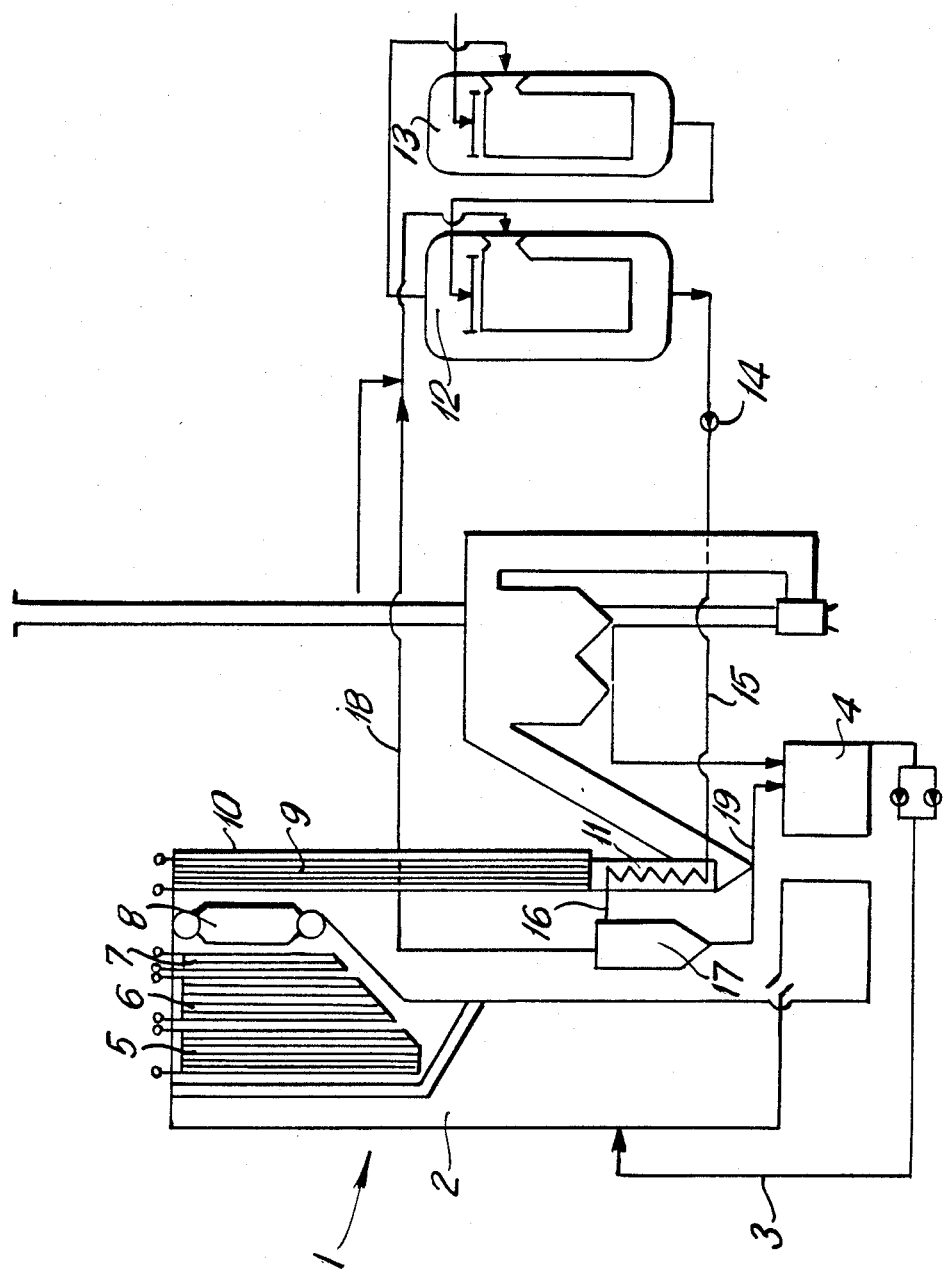

METHOD OF CONCENTRATING SLUDGES

BACKGROUND OF THE INVENTION

The present invention relates to a method of concentrating various sludges such as waste liquor from pulp production.

The waste liquor from pulp production must be concentrated to a dry-substance content of greater than 55% before combustion in a combustion chamber of a soda recovery system is satisfactory possible. The heat contained in the flue gases resulting from the combustion have previously only been used for the production of steam.

Many soda recovery boilers, however, have been designed for a final concentration by direct flue gas evaporation in a flue gas evaporatory. The reasons for doing this include: (1) direct flue gas evaporation does not require expensive apparatus; (2) the evaporation plant itself may be smaller in size; and (3) some waste sludges form heavy deposits on heat surfaces in dry-substance contents of over 50% which means that they are very difficult to treat in indirect evaporators.

Flue gas evaporation, however, also has a number of drawbacks, including: (1) evaporation taking place in one stage and the secondary heat not being utilizable; (2) problems with odors and emissions; and (3) low steam production efficiency of the boiler.

For these reasons, many recovery boilers built according to the flue gas evaporation principle have been modernized by removing the flue gas evaporator, providing a new preheated for water for final cooling of the flue gases, and by building a further evaporating unit for final concentration of the liquor. Such modernization can sometimes be quite extensive, and in the case of heavily contaminating liquors, such as bagasse soda liquor, modernization is not possible at all.

SUMMARY OF THE INVENTION:

Accordingly, it is an object of the present invention to provide a substitute method for flue gas evaporation.

Pursuant to this object, and others which we become apparent hereafter, one aspect of the present invention resides in a method of concentrating sludges wherein the final concentration or evaporation of aqueous waste sludge is carried out in a way which utilizes the heat produced in the combustion chamber of a boiler and contained in the flue gases leaving the boiler for heating the waste sludge under pressure in an indirect heat exchanger so that the pressurized liquor expands to a lower pressure and water evaporates therefrom to concentrate the liquor. The secondary steam produced can be used to replace the primary steam in a series evaporation plant or other apparatus operating with low pressure.

The appropriate temperature range in substituting the flue gas evaporator for black liquid is 200°–400° C. for flue gases, and the final temperature of between 120°–180° C. when the temperature of the supplied liquor is 80°–120° C. and the temperature of the discharged liquor is 160°–250° C.

Depending upon the properties of the liquid to be treated, the temperature can differ from the ones given above.

The inventive method provides the advantage that when a flue gas evaporator is dispensed with, the construction of a pressure heating unit does not require changes in the existing steam generating and heating systems of the boiler, or modifications in the existing series evaporation plant. An additional advantage is that steam produced in single or multistage flash evaporation plants can be utilized in the evaporation or in other processes for substituting the primary steam. Yet another advantage of the present invention is that pressure heating takes place in a concentrating apparatus having no heat surfaces, in a concentration in which no deposits on heat surfaces are created so that further treatment of the liquor is possible in existing apparatus.

The method according to the present invention is described below, by way of example, with reference to the accompanying drawing.

BRIEF DESCRIPTION OF THE DRAWING:

The single FIGURE is a schematic representation of an embodiment of the present invention.

BRIEF DESCRIPTION OF THE PREFERRED EMBODIMENT:

As illustrated in the drawing, a recovery boiler unit 1 is comprised of a combustion chamber 2 into which concentrated waste liquor is supplied via a duct 3 from a vessel 4. When waste liquor is combusted, the combustion gases produced flow into the upper part of the boiler and pass through heating zones 5, 6, 7 and through evaporating zone 8. When the combustion gases have passed over heat transfer surfaces 9 to the lower part of a channel 10, which leads the gases downwardly and is provided with a pressurized heating unit 11 for the waste liquor, the temperature of the gases is 200°–400° C. Waste liquor, which has been concentrated in multi-stage evaporators 12, 13 to have a dry-substance content of approximately 50%, is supplied by a pump 14 through a pipe 15 under a pressure of, for example, approximately 10 bar to the heating unit 11. The waste liquor is indirectly heated in the heating unit 11 by the combustion gases and is then supplied via a pipe 16 to flash-evaporator 17 for expansion to a lower pressure whereby water is evaporated from the liquor so that the liquor is concentrated. The expansion steam is supplied via a duct 18 to the evaporator 12 which operates on the principle of an indirect heat exchange, and the evaporation steam is used there as heating steam. The liquor which has been concentrated to a dry-substance content of over 55% is discharged from the lower part of the flash-evaporator 17 and supplied through a pipe 19 and via the vessel 4 to the combustion chamber 2 of the boiler unit 1.

The following examples further illustrate the invention.

EXAMPLE 1 (COMPARISON EXAMPLE):

The final concentration of black liquor is carried out in a flue gas cyclone evaporator according to the following balance:

| In | M (kg/t d.s.) | dry-substance content (1%) | T (°C.) |
|---|---|---|---|
| Black Liquor | | 52.0% | 95 |
| dry substance | 1000 | | |
| water | 923 | | |
| Flue gas | | | |
| dry substance | 6200 | | |
| water | 1012 | | |
| Total | 9135 | | |
| Out | | | |

-continued

| Black liquor | | 58.6 | 95 |
|---|---|---|---|
| dry-substance | 1000 | | |
| water | 706 | | |
| Flue gas | | | 140 |
| dry-substance | 6200 | | |
| water | 1229 | | |
| Total | 9135 | | |

EXAMPLE 2:

When the flue evaporator is replaced by a pressurized heating unit and a flash-evaporator for liquor the corresponding are as follows:

| In | M (kg/t d.s.) | dry-substance content (1%) | T (°C.) |
|---|---|---|---|
| Black liquor | 1923 | 52.0% | 95 |
| Flue gas | 7212 | | 210 |
| Total | 9135 | | |
| Out | | | |
| Black liquor | 1923 | 52.0 | 183 |
| Flue gas | 7212 | | 140 |
| Total | 9135 | | |
| Flash | | | |
| In | | | |
| Black liquor | 1923 | | 183 |
| Out | | | |
| Black liquor | 1678 | 59.6 | 112 |
| Evaporation | 245 | | 100 |

The volume of the secondary steam being 0.245 t/t dry substance.

While the invention has been illustrated and described as embodied in a method of concentrating sludges, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed is new and desired to be protected by Letters Patent is set forth in the appended claims.

We claim:

1. A method of concentrating waste liquors from pulp production to a dry-substance content of greater than 55%, consisting essentially of indirectly heating the waste liquor under pressure with flue gases produced by combustion of previously concentrated waste liquor, and evaporating water from the thus heated waste liquor by expansion thereof at a lower pressure to concentrate the waste liquor to a dry-substance content which is greater than 55%.

2. A method as claimed in claim 1, wherein the expansion produces steam which is used as primary steam in a series evaporation plant.

* * * * *